United States Patent
Cherkasova et al.

(10) Patent No.: US 8,782,671 B2
(45) Date of Patent: *Jul. 15, 2014

(54) SYSTEMS AND METHODS FOR FLEXIBLY CONTROLLING RESOURCE USAGE BY A DRIVER DOMAIN ON BEHALF OF A VIRTUAL MACHINE

(75) Inventors: Ludmila Cherkasova, Fort Collins, CO (US); Diwaker Gupta, Fort Collins, CO (US); Robert D. Gardner, Fort Collins, CO (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 2330 days.

This patent is subject to a terminal disclaimer.

(21) Appl. No.: 11/493,179

(22) Filed: Jul. 26, 2006

(65) Prior Publication Data
US 2008/0028410 A1  Jan. 31, 2008

(51) Int. Cl.
G06F 3/00 (2006.01)
G06F 9/455 (2006.01)

(52) U.S. Cl.
USPC ............................................. 719/321; 718/1

(58) Field of Classification Search
USPC .......................... 719/310, 321; 708/1; 718/1
See application file for complete search history.

(56) References Cited

U.S. PATENT DOCUMENTS

| | | | |
|---|---|---|---|
| 5,408,617 A | 4/1995 | Yoshida | |
| 5,674,762 A | 10/1997 | See et al. | |
| 5,745,837 A | 4/1998 | Fuhrmann | |
| 6,223,201 B1 | 4/2001 | Reznak | |
| 6,463,352 B1 | 10/2002 | Tadokoro et al. | |
| 6,795,966 B1 | 9/2004 | Lim et al. | |
| 6,877,081 B2 * | 4/2005 | Herger et al. | 711/170 |
| 6,965,730 B2 * | 11/2005 | Chamberlin et al. | 386/293 |
| 7,082,598 B1 | 7/2006 | Le et al. | |
| 7,089,558 B2 | 8/2006 | Baskey et al. | |
| 7,093,004 B2 | 8/2006 | Bernardin et al. | |
| 7,096,469 B1 | 8/2006 | Kubala et al. | |
| 7,142,689 B2 * | 11/2006 | Hayashi et al. | 382/100 |
| 7,191,440 B2 | 3/2007 | Cota-Robles et al. | |
| 7,225,441 B2 | 5/2007 | Kozuch et al. | |
| 7,272,831 B2 | 9/2007 | Cota-Robles et al. | |
| 7,568,190 B2 * | 7/2009 | Creamer et al. | 717/148 |
| 7,770,173 B2 | 8/2010 | Farrell et al. | |
| 7,779,424 B2 | 8/2010 | Cherkasova et al. | |
| 7,788,411 B2 | 8/2010 | Belgaied et al. | |
| 7,797,707 B2 | 9/2010 | Chekasova et al. | |
| 7,934,020 B1 | 4/2011 | Xu et al. | |

(Continued)

OTHER PUBLICATIONS

Cherkasova, Measuring CPU overhead for I/O, 2005.*

(Continued)

Primary Examiner — Lechi Truong

(57) ABSTRACT

A method comprises determining a flexible limit on an amount of resource usage by a driver domain on behalf of a given virtual machine (VM). The method further comprises controlling the resource usage by the driver domain on behalf of the given VM so as not to exceed the flexible limit except under a permitted condition. In certain embodiments the resource usage by the driver domain on behalf of the given VM is controlled so as not to exceed the flexible limit except when a slack share of resource usage is available to the driver domain. Such a slack share of resource usage is a share of resource usage allocated to the driver domain that will not otherwise be used on behalf of another VM.

16 Claims, 4 Drawing Sheets

(56) References Cited

U.S. PATENT DOCUMENTS

| | | |
|---|---|---|
| 2002/0129085 A1 | 9/2002 | Kubala et al. |
| 2003/0037089 A1 | 2/2003 | Cota-Robles et al. |
| 2004/0255295 A1 | 12/2004 | Stackhouse et al. |
| 2005/0120104 A1 | 6/2005 | Boon et al. |
| 2006/0004929 A1* | 1/2006 | Forrer et al. .................... 710/15 |
| 2006/0085784 A1 | 4/2006 | Traut et al. |
| 2006/0143617 A1 | 6/2006 | Knauerhase et al. |
| 2006/0173871 A1 | 8/2006 | Taniguchi et al. |
| 2006/0200819 A1 | 9/2006 | Cherkasova et al. |
| 2006/0200820 A1 | 9/2006 | Cherkasova et al. |
| 2006/0200821 A1 | 9/2006 | Cherkasova et al. |
| 2007/0028237 A1 | 2/2007 | Bulson et al. |
| 2007/0050763 A1 | 3/2007 | Kagan et al. |
| 2007/0130566 A1 | 6/2007 | van Rietschote et al. |
| 2007/0192765 A1 | 8/2007 | Shimogawa et al. |
| 2007/0271560 A1 | 11/2007 | Wahlert et al. |

OTHER PUBLICATIONS

Keir Fraser, Reconstructing I/O, Aug. 2004.*
K.S. Bhashkar, Virtual Instruments: Object-Oriented Program Synthesis, 1986.*
Barham, P. et al., "Xen and the Art of Virtualization", In SOSP '03: Proceedings of the nineteenth ACM symposium on Operating systems principles, pp. 164-177.
Chase, Jeffrey et al., Sharing and Protection in a Single-Address-Space Operating System, ACM Trans. Comput. Syst., 12(4), 1994; pp. 271-307.
Cherkasova, L. et al., "Measuring CPU Overhead for I/O Processing in the Xen Virtual Machine Monitor"; Accepted to 2005 Usenix Annual Technical Conference; 6 pages.
Druschel, Peter et al., "Lazy Receiver Processing (LRP): A Network Subsystem Architecture for Server Systems", In OSDI '96: Proceedings of the second USENIX symposium on Operating systems design and implementation, New York 1996, pp. 261-275.
Chun, Brent et al., "PlanetLab: An Overlay Testbed for Broad-Coverage Services", SIG-COMM Comput. Commun. Rev., 33(3); 2003, pp. 3-12.
Fraser, K. et al., "Reconstructing I/O", Technical Report UCAM-CL-TR-596, University of Cambridge, 2005; pp. 1-16.
Gupta, D. et al., "XenMon: QoS Monitoring and Performance Profiling Tool"; Technical Report HPL-2005-187, HP Labs, 2005, pp. 1-13.
Httperf. [online] Retrieved Jul. 12, 2006 Retrieved from: hpl.hp.com/research/linux/httperf/ 10 pages.
IBM. The Oceano Project; [online] Retrieved on Jul. 11, 2006 Retrieved from: .research.ibm.com/oceanoproject/index.html 1 page.
Kallahalla, M. et al., "Soft UDC: A Software-Based Data Center for Utility Computing", IEEE Computer, No. 2004, pp. 46-54.
Leslie, Ian et al., "The Design and Implementation of an Operating System to Support Distributed Multimedia Applications", IEEE Journal of Selected Areas in Communications, 14(7), 1996, pp. 1280-1297.
Mogul, J.C., et al, "Eliminating Receive Livelock in an Interrupt-driven Kernel"; ACM Trans. Comput. Syst., 15(3), 1997, 14 pages.
Nagar, S., et al., "Improving Linux Resource Control Using CKRM", Ottawa Linux Symposium, 2004, 16 pages.
Waldspurger, C. et al., "Memory Resource Management in VMware ESX Server", SIGOPS Oper. Syst. Rev., 36(SI), 2002 pp. 181-194.
Whitaker, A. et al., "Scale and Performance in the Denali Isolation Kernal"; SIGOPS Oper. Syst. Rev., 36(SI), 2002, pp. 195-209.
U.S. Appl. No. 11/070,674, filed Mar. 2, 2005.
Code of Federal Regulations, title 7 part 273, section 18, paragraph (g)(1) Jan. 1, 2003 pp. 10.
Duda, K. J. et al~Borrowed-virtual-time (BVT) scheduling: supporting latency-sensitive threads in general purpose scheduler:~SIGOPS Oper Syst Rev 33 Dec. 1999 261-276.
Levaseur et al~"Unmodified Device Driver reuse and Improved System Dependability via Virtual Machines"~Proc 6th Symp Operating Sys Design & Imp~Dec. 2004~14 pgs.
Mangan,T~"Server Consolidation/Perceived Performance and Virtual Operating Systems"~TMurgent Technologies~White Papers~Apr. 1, 2005~pp. 1-25.
Netperf Home Page; [online] Retrieved Jul. 13, 2006 Retrieved from: http:netperf.org/netperf/NetperfPage.html; 1.
Ross~MSci Project Proposal Network Router Virtualisation~University of Glasgow~Masters Disseration 2004/2005~pp. 24.
Vaarala~"Security Considerations of Commodity x86 Virtualization"~Helsinki University of Technology~May 22, 2006~pp. 1-150.
Xen The XEN virtual machine monitor; online; University of Cambridge Retrieved form: cl.cam.ac.uk/Research/SRG/netos/xen/downloads/thm; 1~Feb. 21, 2005.

* cited by examiner

US 8,782,671 B2

SYSTEMS AND METHODS FOR FLEXIBLY CONTROLLING RESOURCE USAGE BY A DRIVER DOMAIN ON BEHALF OF A VIRTUAL MACHINE

CROSS-REFERENCE TO RELATED APPLICATIONS

This application is related to U.S. Pat. No. 7,779,424 issued on Aug. 17, 2010 and titled "SYSTEM AND METHOD FOR ATTRIBUTING TO A CORRESPONDING VIRTUAL MACHINE CPU USAGE OF AN ISOLATED DRIVER DOMAIN IN WHICH A SHARED RESOURCE'S DEVICE DRIVER RESIDES", the disclosure of which is hereby incorporated herein by reference. This application is also related to the following concurrently filed and commonly assigned U.S. patent applications: 1) Ser. No. 11/493,506 titled "SYSTEM AND METHOD FOR ATTRIBUTING TO A CORRESPONDING VIRTUAL MACHINE CPU UTILIZATION OF A NETWORK DRIVER DOMAIN BASED ON OBSERVED COMMUNICATION THROUGH A VIRTUALIZED INTERFACE", 2) Ser. No. 11/493,492 titled "SYSTEM AND METHOD FOR ATTRIBUTING TO A CORRESPONDING VIRTUAL MACHINE CPU UTILIZATION OF A NETWORK DRIVER DOMAIN BASED ON WEIGHTED COMMUNICATION", 3) Ser. No. 11/493,348 titled "SYSTEM AND METHOD FOR CONTROLLING AGGREGATE CPU USAGE BY VIRTUAL MACHINES AND DRIVER DOMAINS", 4) Ser. No. 11/493,250 titled "SYSTEM AND METHOD FOR CONTROLLING AGGREGATE CPU USAGE BY VIRTUAL MACHINES AND DRIVER DOMAINS OVER A PLURALITY OF SCHEDULING INTERVALS", and 5) Ser. No. 11/494,187 titled "SYSTEMS AND METHODS FOR CONTROLLING RESOURCE USAGE BY A DRIVER DOMAIN ON BEHALF OF A VIRTUAL MACHINE", the disclosures of which are hereby incorporated herein by reference.

FIELD OF THE INVENTION

The below description is related generally to controlling resource utilization, and more particularly to systems and methods for flexibly controlling an amount of CPU usage by a driver domain on behalf of a virtual machine.

DESCRIPTION OF RELATED ART

Resource pools are collections of computing resources, such as clusters of servers, racks of blades, or other computing resources. The utility data center (UDC) available from Hewlett-Packard Company is one example of a resource pool. Depending on the granularity of a given implementation, a resource pool may be a collection of separate computing devices (e.g., separate servers, separate clusters of servers, etc.) or it may be a collection of resources on a common computing device (e.g., multiple processors on a single server). Various types of resource pools are known, and techniques have been developed for managing access to such resource pools. For instance, virtualization services have been developed that offer interfaces that support the lifecycle management (e.g., create, destroy, move, size capacity) of resource containers (e.g., virtual machines, virtual disks) that provide access to shares of capacity. Various consumers (e.g., applications) may share access to the resources of a resource pool. That is, various consumers may share utilization of the resources in a resource pool for servicing their respective workloads. In this sense, a "consumer" refers to anything (e.g., process, etc.) that consumes capacity of the pool's resources. A consumer generally consumes capacity for use in servicing the consumer's workload. Thus, the consumer has a "demand" for capacity from the resource pool for servicing its workload in a desired manner. In some implementations, workloads are assigned to the resource containers which are then associated with resources. A "processor resource," as used herein, refers to any computing resource now known or later developed that a consumer utilizes in servicing a workload, including without limitation central processing unit(s) (CPU(s)).

To facilitate sharing of a resource pool's capacity between a plurality of consumers (e.g., a plurality of applications), some type of scheme for managing allocation of the pool's capacity among the consumers may be employed. Without such management of allocation, a given consumer may consume all or substantially all of the pool's capacity for servicing its workload, thus leaving the remaining consumers with insufficient capacity for supporting their respective workloads. Accordingly, consumers generally desire some assurance that they will be allocated sufficient capacity of the resource pool to enable the consumers to satisfy their respective quality of service (QoS) goals. As discussed further below, schedulers may be configured to allocate capacity of a resource pool among the consumers in an attempt to manage such allocation in a manner that provides some assurance that the consumers can satisfy their QoS goals (e.g., by balancing allocation among the consumers).

Each resource in a pool may have a processor scheduler that monitors its workloads' demands and dynamically varies the allocation of processor capacity, e.g., CPU, to the workloads, thereby managing the utilization of the processor resources by the various consumers. For instance, the scheduler may dynamically vary allocation of the processor's capacity in a manner that attempts to provide each consumer with access only to the capacity it needs (for servicing its current workload). As a workload's demand increases, the scheduler may increase the amount of the processor's capacity that is allocated to such workload; and as a workload's demand decreases, the scheduler may decrease its allocation of the processor's capacity to such workload. Schedulers are well known for scheduling access to shared processor resources for competing consumers.

Traditionally, general-purpose operating systems assume that they have complete control of a system's physical resources. The operating system ("OS") thus assumes responsibility for such system management as allocation of physical resources, communication, and management of external storage, as examples. Virtualization changes this assumption of sole responsibility by a single OS for management of the system. Similar to the way that a general-purpose OS presents the appearance to multiple applications that each has unrestricted access to a set of computing resources, a virtual machine manages a system's physical resources and presents them to one or more OSs, thus creating for each OS the illusion that it has full access to the physical resources that have been made visible to it.

The current trend toward virtualized computing resources and outsourced service delivery has caused interest to surge in Virtual Machine Monitors (VMMs) that enable diverse applications to run in isolated environments on a shared hardware platform. A VMM is a layer of software that runs on a host platform and provides an abstraction of a complete computer system to higher-level software. That is, a VMM, which may also be referred to as a "hypervisor," is a software layer that virtualizes the available resources of a computer and multiplexes them among one or more guest OSs on the computer system. Many such VMMs are available in the art, such as the VMM known as VMware™ available from VMware, Inc. (see http://www.vmware.com). An abstraction created by VMM is called a virtual machine (VM). Accordingly, a VMM aids in subdividing the ample resources of a modern computer and creating the illusion of multiple virtual machines each running a separate OS instance.

Traditionally, schedulers separately schedule CPU access for different VMs and driver domains. As an example, a weighted proportional-share scheduler may schedule CPU access to different VMs in proportion to a respective weight assigned to each VM. However, a VM may require an access of a device driver in a driver domain, and thus the device driver may consume additional CPU utilization on behalf of the requesting VM. As such, the combined CPU utilization of a VM and a driver domain on behalf of such VM may effectively cause the total CPU usage attributable to the VM to become out of proportion to the VM's respective weight. Thus, a desire exists for a system and method for controlling (e.g., limiting) an amount of CPU usage by a driver domain on behalf of a given VM. Further, in some instances, it may be desirable to flexibly control an amount of CPU usage by a driver domain such that, for example, the amount of CPU usage available for a driver domain on behalf of a given VM is not unduly limited if a slack share of CPU usage is available to the driver domain (e.g., further CPU usage by the driver domain on behalf of other VMs is not needed).

DETAILED DESCRIPTION

Figure 1:
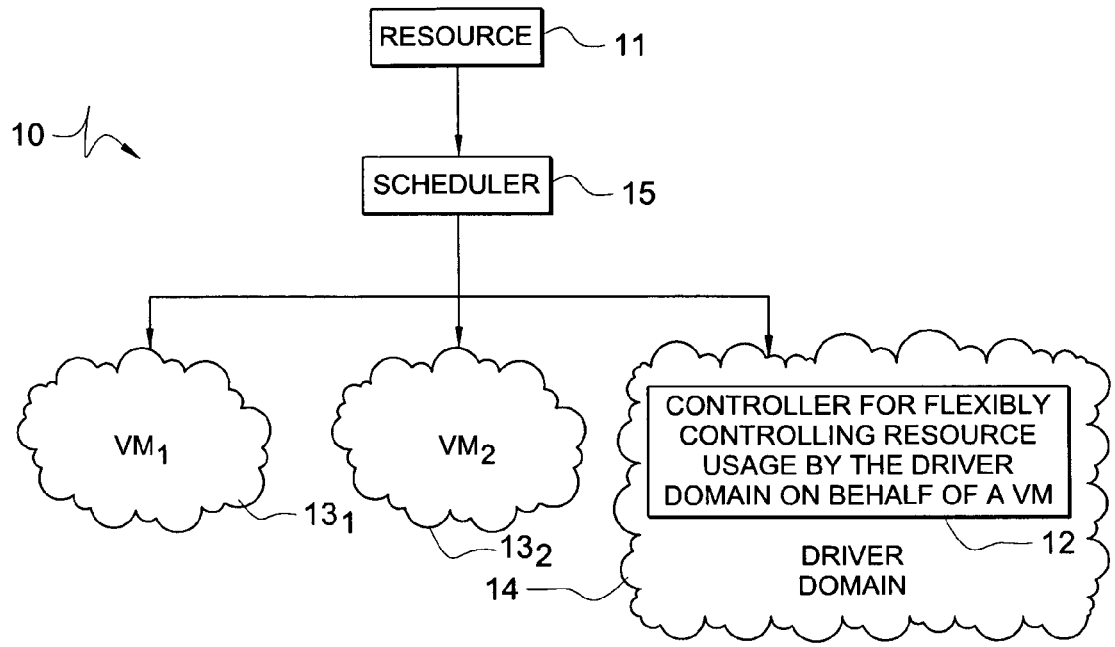
FIG. 1 shows an exemplary system according to an embodiment of the present invention.

FIG. 1 shows an exemplary system according to an embodiment of the present invention. System 10 comprises a resource 11 (e.g., CPU), and various consumers, such as virtual machines (VMs) $13_1$ and $13_2$ and driver domain 14, which consume capacity of the resource 11. While 2 VMs and 1 driver domain are shown for simplicity in FIG. 1, any number of such VMs and driver domains may be implemented in a given system. A scheduler 15 may be provided for scheduling usage of the resource 11 for the various competing consumers. Resource 11 may comprise any shared resource that is used by VMs $13_1$ and $13_2$ and driver domain 14. As discussed further herein, an example of such a shared resource 11 is a central processing unit ("CPU"). Thus, resource 11 may comprise any number of CPUs. The term "CPU" is used broadly herein to refer to any processing logic for processing demands of a consumer's workload.

Additionally, system 10 comprises flexible controller 12, embodiments of which are described further herein. Controller 12 flexibly controls (e.g., limits) access to resource 11 (e.g., CPU) by driver domain 14 on behalf of a given consumer, such as one or both of VMs $13_1$ and $13_2$. As described further below, embodiments of flexible controller 12 are presented herein which are operable to flexibly control an amount of resource usage by driver domain 14 on behalf of a given VM, such as VM $13_1$ or $13_2$. In this sense, the controller need not rigidly limit the amount of CPU usage by a driver domain on behalf of a given VM, but rather enables flexibility such that, for instance, a defined limit on CPU usage by the driver domain on behalf of the given VM may be exceeded in some situations, such as when no further CPU usage demands by the driver domain on behalf of other VMs are present. In the example of FIG. 1, flexible controller 12 is shown as implemented within driver domain 14 for flexibly controlling the amount of usage of resource 11 by driver domain 14 on behalf of a given VM. In other embodiments, flexible controller 12 may be implemented external to driver domain 14, and in certain embodiments may be implemented as part of scheduler 15 for example.

As described further herein, driver domain 14 comprises a device driver that may be used by VMs $13_1$ and $13_2$ for accessing a shared resource. For instance, driver domain 14 may be a network driver domain that comprises a device driver for a network interface, which VMs $13_1$ and $13_2$ may use to access a communication network. Such a device driver may thus use a shared resource 11 (e.g., CPU) for servicing the requests of the VMs $13_1$ and $13_2$. Accordingly, as described further herein, a corresponding amount of resource usage by the driver domain 14 on behalf of a VM may be attributed to such VM. In general, an amount of resource usage by the driver domain 14 is considered as being "on behalf" of a given VM when the resource usage by the driver domain 14 is incurred for servicing demands of the given VM. Embodiments of flexible controller 12 enable an amount of usage of resource 11 by driver domain 14 on behalf of a given VM to be flexibly controlled (e.g., limited). It should be recognized that in many instances it may be desirable to limit the amount of resource usage by a driver domain 14 on behalf of a given VM. Certain embodiments of flexible controller 12 enable such an amount of resource usage by a driver domain 14 on behalf of a given VM to be controllably limited, while providing sufficient flexibility to enable increased resource usage by the driver domain 14 on behalf of the given VM under certain circumstances, such as when no otherwise unused CPU time is allocated to the driver domain 14 (e.g., the driver domain 14 has satisfied the demands of other VMs with extra scheduled CPU time remaining).

As described further herein, in certain embodiments, scheduler 15 may be implemented as an aggregate proportional-share scheduler that schedules access to resource (e.g., CPU) 11 for the VMs and driver domain(s) of the system. The aggregate proportional-share scheduler may take into consideration not only the resource usage of an individual VM, but also the resource usage of driver domain 14 that is attributable to the VM, for scheduling resource access for the VM. That is, such an aggregate proportional-share scheduler may consider an aggregate of resource usage attributable to a given VM, including resource usage of driver domain 14 that is attributable to the given VM, in scheduling shares of resource access to the given VM in proportion to the respective weight assigned to the given VM.

An exemplary aggregate proportional-share scheduler that may be used to scheduling resource access based on an aggregate of resource usage by a VM and by a driver domain on behalf of the VM is described further in concurrently filed and commonly assigned U.S. patent application Ser. No. 11/493,348 titled "SYSTEM AND METHOD FOR CONTROLLING AGGREGATE CPU USAGE BY VIRTUAL MACHINES AND DRIVER DOMAINS", the disclosure of which is incorporated herein by reference. It should be recognized that because such an aggregate scheduler may consider an aggregate resource usage (e.g., CPU usage) by a VM and by a driver domain in scheduling resource access to the VM, the amount of resource access scheduled for the VM may be undesirably limited due to excessive use of the resource by the driver domain on behalf of the VM. In other words, the amount of resource usage scheduled for direct usage by the VM may be undesirably limited by the aggregate proportional-share scheduler because of an excessive amount of indirect resource usage on behalf the VM by a driver domain. Thus, this is one example as to why it may be desirable to control an amount of resource usage by a driver domain on behalf of a given VM. Other scenarios may exist in a given system for which it may be desirable to controllably limit the amount of resource usage by a driver domain on behalf of a given VM. Of course, embodiments of the controller 12 described herein may be employed independent of and irrespective of the type of scheduling that may be employed in a system. Thus, while use of controller 12 in a system that employs an aggregate proportional-share scheduler provide an example of a system in which such controller may be beneficially utilized, utilization of embodiments of such controller 12 are not limited to systems that employ aggregate proportional-share schedulers, but instead embodiments of controller 12 may be employed to advantageously control an amount of resource usage by a driver domain on behalf of a given VM irrespective of the scheduler employed by the system.

As described above, virtualization enables resources to be shared between a plurality of VMs. A VMM is a software layer that virtualizes the available resources of a computer system and multiplexes them among one or more guest OSs on the computer system. As used herein, the term guest operating system refers to one of the OSs that the VMM can host, and the term domain refers to a running virtual machine within which a guest OS executes. Thus, the terms virtual machine (VM) and domain are used interchangeably herein. A privileged management domain refers to a domain that manages the creation and/or termination of other guest domains and may manage other parameters, such as CPU scheduling parameters, resource allocation policies, etc. A driver domain refers to a domain in which a device driver for one or more shared resources resides. An isolated driver domain refers to a domain in which a device driver is placed such that failure of the device driver does not interrupt any other domains in the system. The VMM may be referred to as a hypervisor because it operates at a higher privilege level than the supervisor code of the guest OSs that it hosts. Thus, the terms VMM and hypervisor are used interchangeably herein.

Typically, VMMs are classified into two groups: 1) "Type I VMMs" that run directly on physical hardware and thus provide an abstraction that is identical to the hardware underneath the VMM, such as IBM's VM/370; and 2) "Type II VMMs" that run as an application on a host operating system, such as user-mode Linux. Type I and Type II machines are available in the art. For instance, VMWare, Inc. provides both types of VMMs. In a traditional Type I VMM, the exposed virtual hardware functionality is identical to the underlying machine. This "full virtualization" has the main benefit of allowing unmodified OSs to be hosted. However, support for full virtualization was never a part of prevalent IA-32 (e.g., x86) architecture, and the efficient virtualization is difficult, i.e., it can be only achieved at the cost of increased complexity and reduced performance.

Several aspects of virtualization make it difficult or slow for a VMM to provide an interface that is identical to the physical hardware. For instance, some architectures include instructions whose behavior depends on whether the CPU is running in privileged or user mode (sensitive instructions), yet which can execute in user mode without causing a trap to the VMM. Virtualizing these sensitive-but-unprivileged instructions generally requires binary instrumentation, which adds significant complexity and may add significant overhead. For example, VMware's ESX Server dynamically rewrites portions of the hosted machine code to insert traps wherever VMM intervention might be required. In addition, emulating I/O devices at the low-level hardware interface (e.g. memory-mapped I/O) causes execution to switch frequently between the guest OS accessing the device and the VMM code emulating the device. To avoid the overhead associated with emulating a low-level device interface, most VMMs encourage or require the user to run a modified version of the guest OS. For example, the VAX VMM security kernel, VMware Workstation's guest tools add special drivers in the guest OS to accelerate the virtualization of some devices.

Another virtualization technique, called paravirtualization, has been recently introduced, that avoids the drawbacks of full virtualization by presenting a virtual model machine abstraction that is similar but not identical to the underlying hardware. This technique provides improved performance, but it also requires modification to the guest OSs, i.e. the commodity system needs to be ported to a paravirtualized environment. Xen™ is an example of a known VMM for x86 based on the paravirtualization technique, which supports execution of multiple guest OSs and that does not require changes to the application binaries interfaces (ABI), and hence no modifications are required to guest applications. Xen is an open source VMM, and the latest stable release of Xen is version 3.0.1. In certain virtualization techniques, device drivers for shared resources are located in a privileged management domain, and thus to access those shared resources the virtual machines communicate with such privileged management domain. Further, in certain virtualization techniques, device drivers for shared resources are located in an isolated driver domain to improve dependability, maintainability, and manageability of the shared resources.

Figure 2A:
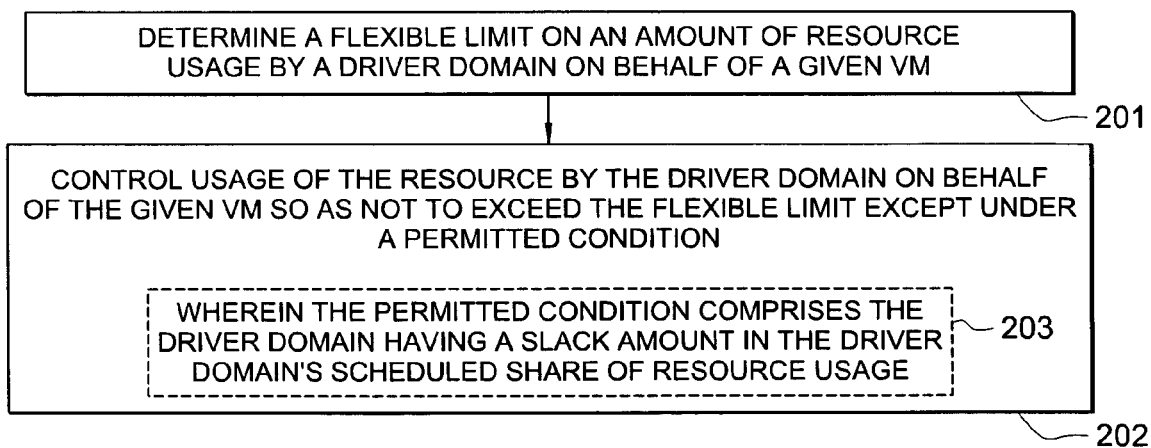
FIGS. 2A-2B show exemplary operational flows according to certain embodiments of the present invention.

For various reasons, it may be desirable to flexibly limit an amount of CPU utilization by a driver domain, such as an isolated driver domain (IDD) on behalf of a given VM. Turning to FIG. 2A, an exemplary operational flow diagram according to one embodiment of the present invention is shown. In operational block 201, controller 12 determines a flexible limit on an amount of resource usage by a driver domain 14 on behalf of a given VM (e.g., VM $13_1$). As described further herein, such a flexible limit amount may be determined from user input and/or as a function of a predefined limit on an aggregate amount of resource usage attributable to the given VM, as examples. In operational block 202, controller 12 controls usage of the resource by the driver domain on behalf of the given VM so as not to exceed the flexible limit except under a permitted condition. As shown in block 203, one example of a permitted condition is when the driver domain has a slack amount in its scheduled share of resource usage. For example, a driver domain may be scheduled a share of, say, 30 milliseconds (ms) of resource usage, and the driver domain may have "slack" present in its scheduled share when its usage of the resource on behalf of the given VM reaches the flexible limit amount. For instance, the flexible limit amount for the given VM may be 15 ms, an the driver domain may have 15 ms remaining thereafter that is not required to be used on behalf of any other VMs present in the system. Therefore, under this permitted condition, the flexible limit amount assigned for the given VM may be exceeded to permit additional usage of the resource by the driver domain on behalf of the given VM during the slack time available in the driver domain's scheduled share of resource usage. Such a slack amount is described further herein. According to certain embodiments, other permitted conditions in addition to or instead of a slack amount being available in the driver domain's scheduled share of resource usage may be defined to permit the flexible limit on the amount of resource usage by the driver domain on behalf of the given VM to be exceeded.

In certain embodiments, a limit on the total amount of resource usage to be scheduled during any given scheduling interval for a driver domain 14 may be defined. For instance, a weighted proportional-share scheduler (e.g., scheduler 15) may, during a given scheduling interval, schedule a share of resource usage for the driver domain 14 in proportion to a pre-defined weight assigned to the driver domain 14. For instance, suppose that VMs $13_1$, $13_2$, and driver domain 14 are weighted equally such that they each should receive equal shares of CPU, say a 30% share each scheduling interval. In this manner, a scheduler may have scheduling intervals of 100 milliseconds (ms) each, for example, wherein the scheduler will schedule 30 ms of CPU access to each of VMs $13_1$, $13_2$, and driver domain 14 during each scheduling interval. In this manner, the scheduler 15 attempts to fairly allocate CPU capacity to the VMs and driver domain in proportion to their respective weights, which are equal in this example.

Further, according to certain embodiments of the present invention, the amount of resource usage (e.g., CPU usage) that may be scheduled for the driver domain on behalf of a given VM may be further limited. For instance, while in the above example the total share of CPU that may be scheduled for the driver domain 14 in any given scheduling interval may be 30 ms, the amount of such CPU usage by the driver domain 14 on behalf of a given VM may be flexibly limited to some amount less than 30 ms. For example, the amount of CPU that may be scheduled for the driver domain 14 to use on behalf of VM $13_1$ may be flexibly limited to, say, 10 ms in any given scheduling interval. Thus, while the driver domain 14 may receive a total of 30 ms share of each 100 ms scheduling interval, in this example, the amount of CPU usage by driver domain 14 on behalf of VM $13_1$ may be flexibly limited (e.g., by controller 12) to 10 ms, wherein the 10 ms flexible limit may be exceeded when a permitted condition exists (e.g., when there is slack amount available in the 30 ms share of a scheduling interval allotted to the driver domain).

Figure 2B:
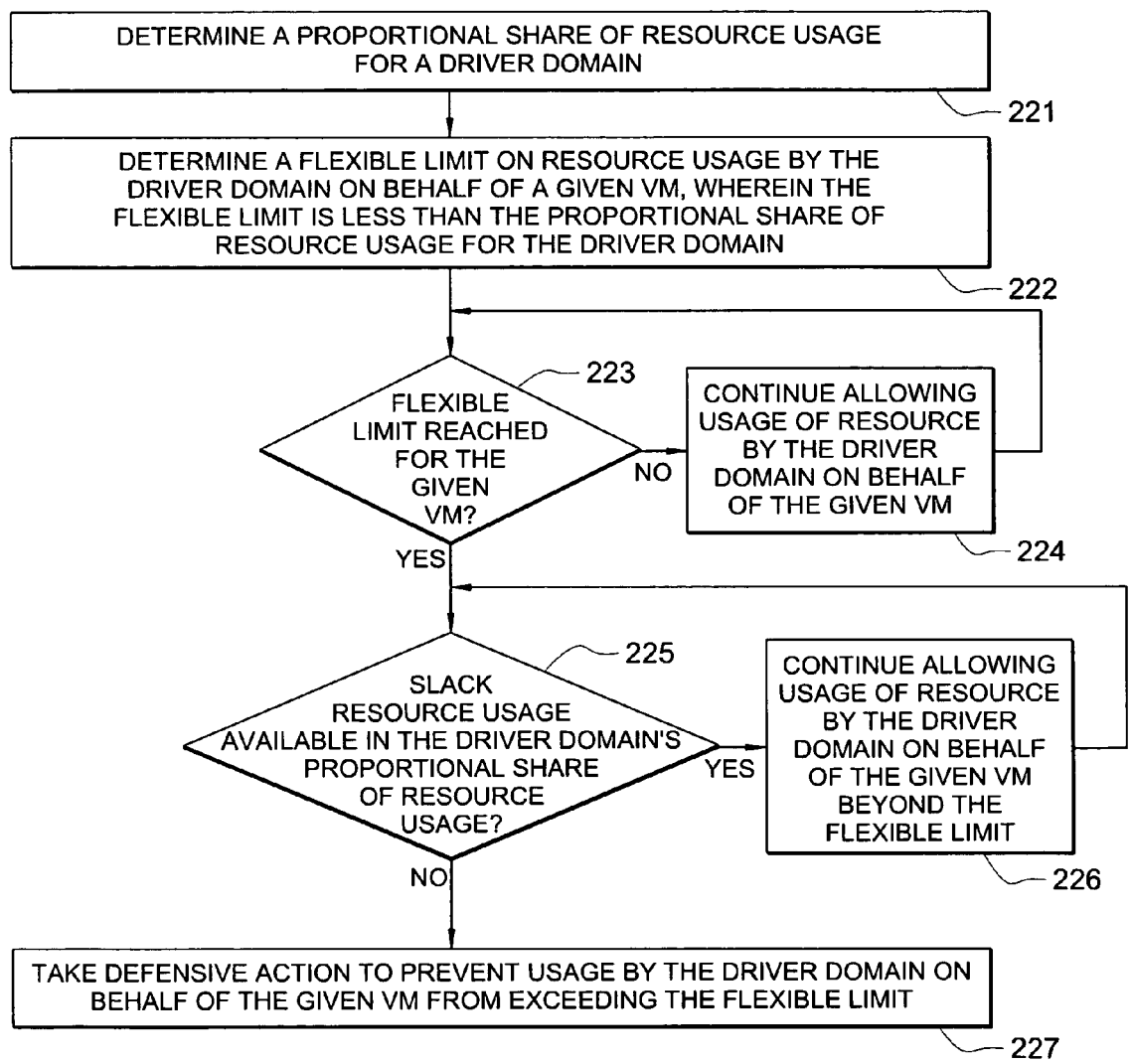

FIG. 2B shows another exemplary operational flow according to certain embodiments of the present invention. In block 221, scheduler 15 determines a proportional share of resource usage for a driver domain during a given scheduling interval. For instance, in the above example, the determined proportional share of CPU usage by driver domain 14 is 30% of a given scheduling interval (e.g., 30 ms of a 100 ms scheduling interval). In block 222, controller 12 determines a flexible limit on resource usage by the driver domain 15 on behalf of a given VM, wherein the flexible limit is less than the proportional share of resource usage scheduled for the driver domain. For instance, in the above example, the flexible limit on resource usage by driver domain 14 on behalf of VM $13_1$ is defined as 10 ms, which is less than the driver domain's proportional share of 30 ms of a 100 ms scheduling interval. In operational block 223, controller 12 determines whether the flexible limit is reached for the given VM. That is, in the above example, the controller 12 determines whether the driver domain has used 10 ms of CPU on behalf of the VM $13_1$. If not, operation advances to block 224 where usage of the resource by the driver domain on behalf of the given VM continues to be allowed.

When determined in block 223 that the amount of resource usage by the driver domain on behalf of the given VM has reached the flexible limit, operation advances to block 225. In block 225, controller 12 determines whether slack resource usage is available in the driver domain's proportional share of resource usage. For instance, in the above example, controller 12 determines whether slack resource usage (i.e., resource usage that is not required for another VM) remains available in the driver domain's proportional share of 30 ms of a 100 ms scheduling interval. If such slack resource usage is available, then controller 12 allows continued usage of the resource by the driver domain on behalf of the given VM beyond the flexible limit, in block 226. Thus, the defined flexible limit can be exceeded when such slack resource usage is available in a share of a scheduling interval that is allocated to the driver domain. If no such slack resource usage remains available in a given scheduling interval, then in block 227 controller 12 takes defensive action(s) to prevent further resource usage by the driver domain on behalf of the given VM during the given scheduling interval so that the flexible limit is not exceeded. Thus, usage of the resource by the driver domain 14 on behalf of the given VM can be flexibly controlled so as not to exceed the flexible limit determined in block 222 except when slack resource usage is available in a share of a scheduling interval allocated to the driver domain.

As described further hereafter, in certain embodiments, scheduler 15 is implemented as an aggregate proportional-share CPU scheduler. For various reasons, including without limitation management of resource allocation, it is often desirable to monitor the CPU utilization that is attributable to each of the VMs that may be implemented on a system. Traditional monitoring systems typically report the amount of CPU allocated by the scheduler for execution of a particular VM over time. However, this method often fails to reveal the "true" usage of the CPU by different VMs. For instance, in certain virtualization techniques, device drivers for shared resources are located in isolated driver domains, and thus to access those shared resources the VMs communicate with such isolated driver domains. Accordingly, the isolated driver domains use the CPU in processing the access requests received from the VMs. The CPU utilization of the isolated driver domains in servicing the requests of each VM (requesting to access a resource) are not attributed to the corresponding VMs in the traditional technique of monitoring VM CPU utilization (i.e., as those techniques report the amount of CPU allocated to a VM by the scheduler). Thus, the full CPU utilization of the VMs, including the corresponding isolated driver domain CPU utilization, is not determined.

For example, virtualization of input/output (I/O) devices results in an I/O model where the data transfer process involves additional system components, such as an isolated driver domain in which device drivers for the I/O resources reside. Hence, the CPU usage when the isolated driver domain handles the I/O data on behalf of a particular VM should be charged to the corresponding VM. However, simply monitoring the CPU utilization allocated by the scheduler to the corresponding VM fails to account for the CPU utilization of the isolated driver domain in handling the I/O data on behalf of such corresponding VM. Thus, the traditional technique of determining CPU utilization of each VM does not fully capture the CPU utilization attributable to a VM, as it fails to account for the corresponding isolated driver domain CPU utilization that is performed for each VM.

Certain techniques for communication between a VM and an isolated driver domain and attributing to the VM corresponding CPU usage of the isolated driver domain are described in U.S. Pat. No. 7,779,424 issued on Aug. 17, 2010 and titled "SYSTEM AND METHOD FOR ATTRIBUTING TO A CORRESPONDING VIRTUAL MACHINE CPU USAGE OF AN ISOLATED DRIVER DOMAIN IN WHICH A SHARED RESOURCE'S DEVICE DRIVER RESIDES", the disclosure of which is hereby incorporated herein by reference. Certain embodiments presented therein attribute such CPU usage of an isolated driver domain to a corresponding VM based on a memory page exchange count. While such usage of memory page exchange count may provide a good estimate, it may introduce some inaccuracy due, for example, to the specific memory page exchange procedure employed by the VMM. For instance, often the VMM commercially known as Xen-3™ opportunistically performs additional memory page exchanges in order to keep a sufficient pool of memory pages in an isolated driver domain. Due to Direct Memory Access (DMA), some of the I/O data from a VM can be directly written to memory in an isolated driver domain ("IDD").

Certain embodiments of concurrently filed and commonly assigned U.S. patent application Ser. No. 11/493,506 titled "SYSTEM AND METHOD FOR ATTRIBUTING TO A CORRESPONDING VIRTUAL MACHINE CPU UTILIZATION OF A NETWORK DRIVER DOMAIN BASED ON OBSERVED COMMUNICATION THROUGH A VIRTUALIZED INTERFACE", the disclosure of which is incorporated herein by reference, provide a more accurate technique for observing communication between a VM and a network driver domain (e.g., an isolated network driver domain ("net-IDD")) and attributing to the VM corresponding CPU usage of the network driver domain, by observing the amount of communication flowing through a virtualized interface between such VM and the network driver domain. That is, in U.S. patent application Ser. No. 11/493,506 titled "SYSTEM AND METHOD FOR ATTRIBUTING TO A CORRESPONDING VIRTUAL MACHINE CPU UTILIZATION OF A NETWORK DRIVER DOMAIN BASED ON OBSERVED COMMUNICATION THROUGH A VIRTUALIZED INTERFACE" exemplary systems and methods are disclosed for observing an amount of communication through a virtualized interface between a VM and a network driver domain and determining from such observed amount of communication a corresponding amount of the network driver domain's CPU utilization that is attributable to the VM. Thus, a corresponding amount of a network driver domain's CPU utilization to attribute to a VM may be computed based on an amount of communication (e.g., number of network packets) observed through the virtualized interface between the VM and the network driver domain.

In some instances, however, the amount of CPU utilization of a network driver domain may not correspond equally to the amount of communication between the VM and the network driver domain. Rather, the amount of CPU utilization of the network driver domain may differ depending on certain characteristics of the communication. For instance, in some systems the amount of CPU utilization of the network driver domain may differ for different sized packets. Additionally or alternatively, the amount of CPU utilization of the network driver domain may differ between packets received from a VM directed to the network driver versus packets from the communication network directed to the VM. Thus, certain embodiments of concurrently filed and commonly assigned U.S. patent application Ser. No. 11/493,492 titled "SYSTEM AND METHOD FOR ATTRIBUTING TO A CORRESPONDING VIRTUAL MACHINE CPU UTILIZATION OF A NETWORK DRIVER DOMAIN BASED ON WEIGHTED COMMUNICATION", the disclosure of which is incorporated herein by reference, provide an even further accurate technique attributing a network driver domain's CPU usage to a corresponding VM. In such further accurate technique, a "weighted" amount of communication observed through a virtualized interface between a VM and a network driver domain is determined, wherein such weight is determined at least in part on certain characteristics of the observed communication, such as the size of the observed packets and/or the direction of the packets along a communication path. The "weighted" amount of communication observed may then be used for more accurately determining a corresponding amount of CPU utilization by the network driver domain to attribute to the VM.

Concurrently filed and commonly assigned U.S. patent application Ser. No. 11/493,348 titled "SYSTEM AND METHOD FOR CONTROLLING AGGREGATE CPU USAGE BY VIRTUAL MACHINES AND DRIVER DOMAINS", the disclosure of which is incorporated herein by reference, describes exemplary embodiments of an aggregate proportional-share scheduler. Such embodiments of the aggregate proportional-share scheduler may employ any of the above-identified techniques, or any other technique now known or later developed, for attributing CPU usage of a driver domain to a corresponding VM that caused such CPU usage by the driver domain. Once an amount of CPU usage of a driver domain that is attributable to a VM is determined, the aggregate proportional-share scheduler may schedule CPU access to the VM based on the aggregate CPU usage attributable to such VM (e.g., both the VM's direct CPU usage and the CPU usage of a driver domain attributable to the VM). Thus, the aggregate proportional-share scheduler may schedule CPU usage for a VM so as to maintain the aggregate CPU usage that is attributable to the VM (i.e. both the VM's direct CPU usage and the CPU usage of a driver domain attributable to the VM) in proportion to the relative weight assigned to the VM. Thus, as the amount of CPU usage by the driver domain on behalf of the VM increases, the amount of CPU usage scheduled for direct usage by the VM may decrease to maintain the aggregate CPU usage attributable to the VM in proportion to the VM's respective weight.

Of course, it should be recognized that without some control over the amount of CPU usage of the driver domain on behalf of the VM, the driver domain may consume an excessive amount of CPU usage on behalf of the VM, thereby undesirably restricting the amount of CPU usage that may be scheduled for direct usage by the VM. For instance, again consider the above example wherein VMs $13_1$ and $13_2$ are weighted equally such that they each should receive equal shares of CPU, say a 30% share each scheduling interval. In this manner, an aggregate proportional-share scheduler may have scheduling intervals of 100 ms each, for example, wherein the scheduler will schedule CPU access to provide an aggregate of 30 ms of CPU access to each of VMs $13_1$ and $13_2$ for each scheduling interval. In certain embodiments of an aggregate proportional-share scheduler, the scheduler may subtract any amount of CPU usage in one scheduling interval by a driver domain on behalf of a given VM from an amount of CPU usage scheduled for the given VM in a next scheduling interval. For instance, continuing with the above example, suppose that in a first scheduling interval the scheduler schedules 30 ms of CPU usage for VM $13_1$ and also schedules 15 ms of CPU usage for driver domain 14 on behalf of VM $13_1$. In the second scheduling interval, the scheduler may subtract the 15 ms of "additional" CPU usage by driver domain 14 that was attributed to VM $13_1$ in the first interval from the 30 ms of CPU usage that would otherwise be scheduled for VM $13_1$ (i.e., the VM $13_1$'s proportional share) such that only 15 ms of CPU usage is scheduled for VM $13_1$ in the second scheduling interval. Suppose now that in a first scheduling interval the scheduler schedules 30 ms of CPU usage for VM $13_1$ and also schedules 30 ms of CPU usage for driver domain 14 on behalf of VM $13_1$. In the second scheduling interval, the scheduler may subtract the 30 ms of "additional" CPU usage by driver domain 14 that was attributed to VM $13_1$ in the first interval from the 30 ms of CPU usage that would otherwise be scheduled for VM $13_1$ (i.e., the VM $13_1$'s proportional share) such that no CPU usage is scheduled for VM $13_1$ in the second scheduling interval. In this manner, if the CPU usage by the driver domain 14 on behalf of VM $13_1$ is not limited, then the driver domain 14 may effectively starve the VM $13_1$ from receiving any direct CPU usage.

Thus, embodiments of concurrently filed and commonly assigned U.S. patent application Ser. No. 11/494,187 titled "SYSTEMS AND METHODS FOR CONTROLLING RESOURCE USAGE BY A DRIVER DOMAIN ON BEHALF OF A VIRTUAL MACHINE", the disclosure of which is incorporated herein by reference, provide techniques for limiting the amount of CPU usage by a driver domain on behalf of a given VM. In this manner, when used in conjunction with an aggregate proportional-share scheduler, such as the embodiments of an aggregate proportional-share scheduled described in concurrently filed and commonly assigned U.S. Pat. No. 8,032,882 titled "SYSTEM AND METHOD FOR CONTROLLING AGGREGATE CPU USAGE BY VIRTUAL MACHINES AND DRIVER DOMAINS", the amount of CPU usage by a driver domain on behalf of a given VM may be limited so as not to consume an undesirably large amount of the permitted aggregate amount of CPU usage attributable to the given VM.

In some situations, it may be desirable to enable CPU usage by the driver domain to exceed the defined limit. For instance, in a work conserving scheduler, an available "slack" amount of a share of CPU scheduled for a the driver domain may be used on behalf of the driver domain beyond the defined limit, thereby making efficient utilization of the CPU scheduled for the driver domain (rather than "wasting" the slack amount by enforcing the defined limit). Embodiments of the present invention therefore enable the amount of CPU usage by a driver domain on behalf of a VM to be flexibly controlled, wherein a defined limit can be enforced when no slack is available in a share of a scheduling interval allocated to the driver domain and the limit can be relaxed (or not enforced) when slack is available in a share of scheduling interval allocated to the driver domain.

Embodiments of the present invention may, if so desired, be employed in conjunction with an aggregate proportional-share scheduler. Of course, application of embodiments of the present invention are not limited for use in systems that employ an aggregate proportional-share scheduler, but rather those systems provide one example wherein an embodiment of controller 12 may be desired. In certain embodiments, any amount of "slack" share of CPU usage by a driver domain on behalf of a given VM may not impact the amount of share of CPU access scheduled in the future for the given VM. That is, in certain embodiments, the amount of "slack" share of CPU usage by a driver domain on behalf of a given VM may not be considered as part of the given VM's aggregate proportional share of CPU. Accordingly, in certain embodiments, the amount of CPU usage by a driver domain on behalf of a given VM may be flexibly limited to a predefined limit amount (wherein the usage up to the predefined limit amount may impact the given VM's aggregate proportional share of CPU, and thus may impact an amount of CPU scheduled in the future for the given VM), but any amount of "slack" share of CPU usage by the driver domain above the predefined limit may not so impact the given VM's aggregate proportional share of CPU, as discussed further below.

Figure 3:
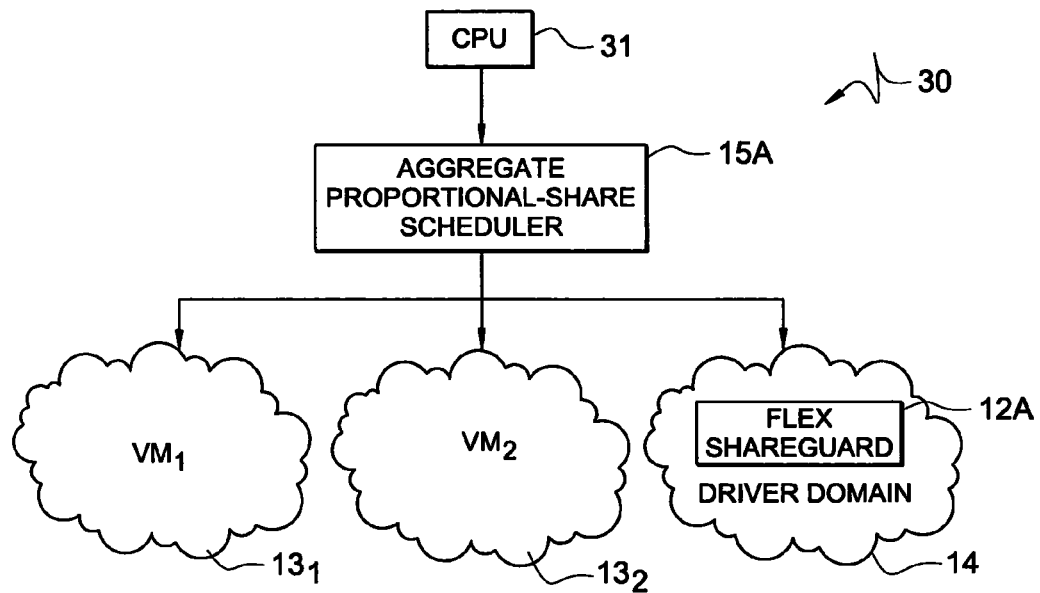
FIG. 3 shows an exemplary system according to one embodiment of the present invention.

FIG. 3 shows an exemplary system 30 according to one embodiment of the present invention. In the example of FIG. 3, scheduler 15 of FIG. 1 is implemented as an aggregate proportional-share scheduler 15A, such as the exemplary aggregate proportional-share scheduled described in concurrently filed and commonly assigned U.S. Pat. No. 8,032,882 titled "SYSTEM AND METHOD FOR CONTROLLING AGGREGATE CPU USAGE BY VIRTUAL MACHINES AND DRIVER DOMAINS". In this example, flexible controller 12 is implemented as "Flex Shareguard" logic 12A within driver domain 14. Flex Shareguard logic 12A may be implemented as a software application, hardware, firmware, or any combination thereof. An exemplary implementation of such Flex Shareguard logic 12A is described further below. Also in this example, the shared resource (e.g., resource 11 of FIG. 1 is CPU 31, which may be one or more CPUs. Aggregate proportional-share scheduler 15A schedules access to CPU 31 for various consumers, such as VMs $13_1$ and $13_2$ and driver domain 14. Embodiments of aggregate proportional-share scheduler 15A take into consideration not only the CPU usage of an individual VM, but also the CPU usage of driver domain 14 that is attributable to the VM, for scheduling CPU access for the VM. That is, aggregate proportional-share scheduler 15A considers an aggregate of CPU usage attributable to a given VM, including CPU usage of driver domain 14 that is attributable to the given VM, in scheduling shares of CPU to the given VM in proportion to the respective weight assigned to the given VM.

As described further herein, Flex Shareguard 12A is implemented to flexibly limit an amount of CPU usage by driver domain 14 on behalf of a given VM. In this manner, the amount of a VM's aggregate CPU usage that is attributable to usage by a driver domain on behalf of the VM is flexibly limited to, for example, permit a desired amount of CPU usage to be available for direct use by the VM. For instance, an aggregate proportional-share scheduler 15A may schedule CPU access to a given VM, such as VM $13_1$ of FIG. 3. The aggregate proportional-share scheduler 15A may also schedule CPU access to a driver domain 14, wherein an amount of CPU access by the driver domain on behalf of the given VM is flexibly limited (e.g., by Flex Shareguard logic 12A). For instance, a flexible limit on the amount of CPU usage by the driver domain on behalf of the given VM may be defined for the given VM. In certain embodiments, the flexible limit may be defined as a function of an aggregate proportional share of CPU access that is attributable to the given VM. For instance, suppose as in the above examples that the weighting assigned to VM $13_1$ dictates that its aggregate proportional share of CPU is 30% of a scheduling interval (e.g., 30 ms of a 100 ms scheduling interval); in such an example, the amount of the flexible limit on CPU usage by the driver domain 14 on behalf of VM $13_1$ may be defined as 50% of the aggregate proportional share of CPU for VM $13_1$, which is 15% (or 15 ms of a 100 ms scheduling interval) in this example. In certain embodiments provided herein, a user (e.g., system administrator) may define the amount of such flexible limit for the given VM (e.g., a user may specify that the amount of the flexible limit on CPU access by the driver domain on behalf of VM $13_1$ is 50% of the aggregate proportional share of CPU for VM $13_1$ in the above example). For example, in certain embodiments, controller 12 (e.g., Flex Shareguard 12A) may provide a user interface that enables a user to input information defining such flexible limit on the amount of CPU by a driver domain in any scheduling interval on behalf of a given VM.

Figure 4:
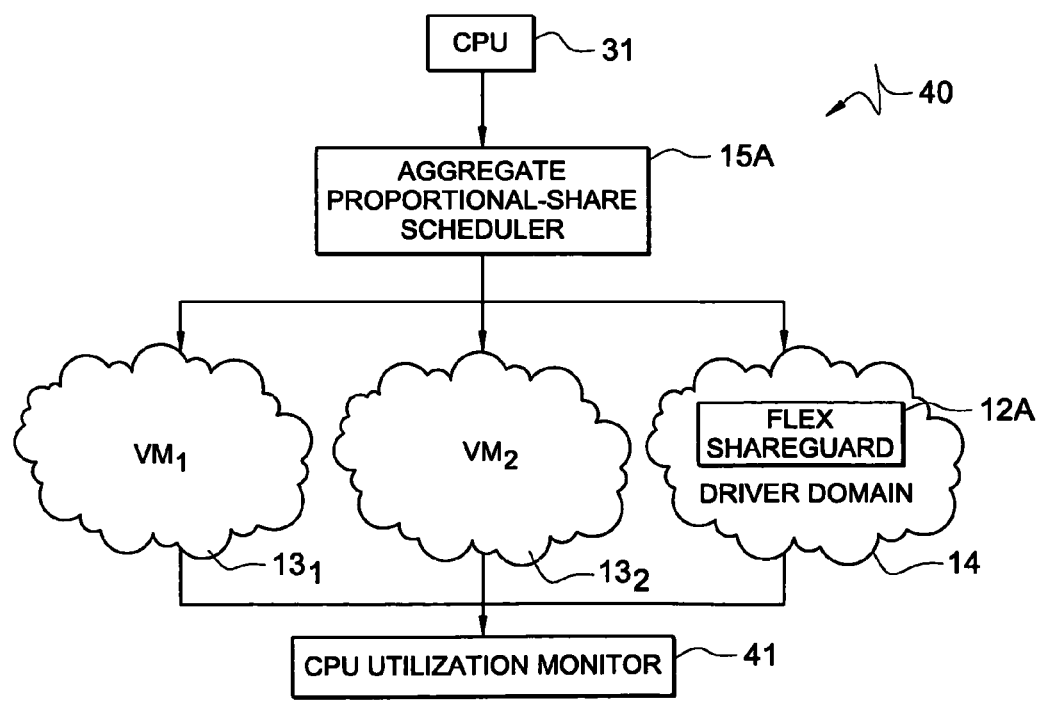
FIG. 4 shows another exemplary system employing an embodiment of the present invention.

FIG. 4 shows another exemplary system 40 employing an embodiment of the present invention. As shown, as with FIG. 3, FIG. 4 includes aggregate proportional-share scheduler 15A that is operable to schedule access to CPU 31 for various consumers, such as VMs $13_1$ and $13_2$ and driver domain 14. Driver domain 14 is adapted to include Flex Shareguard 12A to flexibly limit an amount of CPU usage by such driver domain 14 on behalf of a given VM. In the exemplary system 40 of FIG. 4, a CPU utilization monitor 41 is included, which is operable to monitor CPU usage of driver domain 14 and attribute the CPU usage of the driver domain 14 to the corresponding VM that caused such CPU usage. That is, driver domain 14 may consume CPU capacity on behalf of a given VM (e.g., for performing tasks requested by a given VM), up to the flexible limit depending on enforcement of the flexible limit by Flex Shareguard 12A, and CPU utilization monitor 41 may attribute such CPU utilization of the driver domain 14 to the given VM. CPU utilization monitor 41 may employ the techniques described in any of the following co-pending U.S. patent applications, as examples, for attributing CPU utilization of the driver domain 14 to the corresponding VM: 1) U.S. Pat. No. 7,779,424 issued on Aug. 17, 2010 and titled "SYSTEM AND METHOD FOR ATTRIBUTING TO A CORRESPONDING VIRTUAL MACHINE CPU USAGE OF AN ISOLATED DRIVER DOMAIN IN WHICH A SHARED RESOURCE'S DEVICE DRIVER RESIDES", 2) concurrently filed U.S. patent application Ser. No. 11/493,506 titled "SYSTEM AND METHOD FOR ATTRIBUTING TO A CORRESPONDING VIRTUAL MACHINE CPU UTILIZATION OF A NETWORK DRIVER DOMAIN BASED ON OBSERVED COMMUNICATION THROUGH A VIRTUALIZED INTERFACE", and 3) concurrently filed U.S. patent application Ser. No. 11/493,492 titled "SYSTEM AND METHOD FOR ATTRIBUTING TO A CORRESPONDING VIRTUAL MACHINE CPU UTILIZATION OF A NETWORK DRIVER DOMAIN BASED ON WEIGHTED COMMUNICATION", the disclosures of which are incorporated herein by reference. Of course, other techniques now known or later developed for attributing CPU utilization of a driver domain to a corresponding VM may be employed by CPU utilization monitor 41 in other embodiments.

Thus, as shown in FIG. 4, CPU utilization monitor 41 may determine an aggregate amount of CPU usage for each of VMs $13_1$ and $13_2$, including their respective attributed CPU usage by driver domain 14. Aggregate proportional-share CPU scheduler 15A may then use the determined aggregate amount of CPU usage determined by CPU utilization monitor 41 for managing its scheduling of CPU access for the VMs $13_1$ and $13_2$ and/or driver domain 14 to maintain the aggregate CPU usage of each VM in proportion to its respective assigned weight. Again, as described further herein, Flex Shareguard logic 12A flexibly limits an amount of CPU usage by driver domain 14 on behalf of a given VM. In this manner, the amount of a VM's aggregate CPU usage that is attributable to usage by a driver domain on behalf of the VM is flexibly limited to, for instance, permit a desired amount of CPU usage to be available for direct use by the VM.

Figure 5:
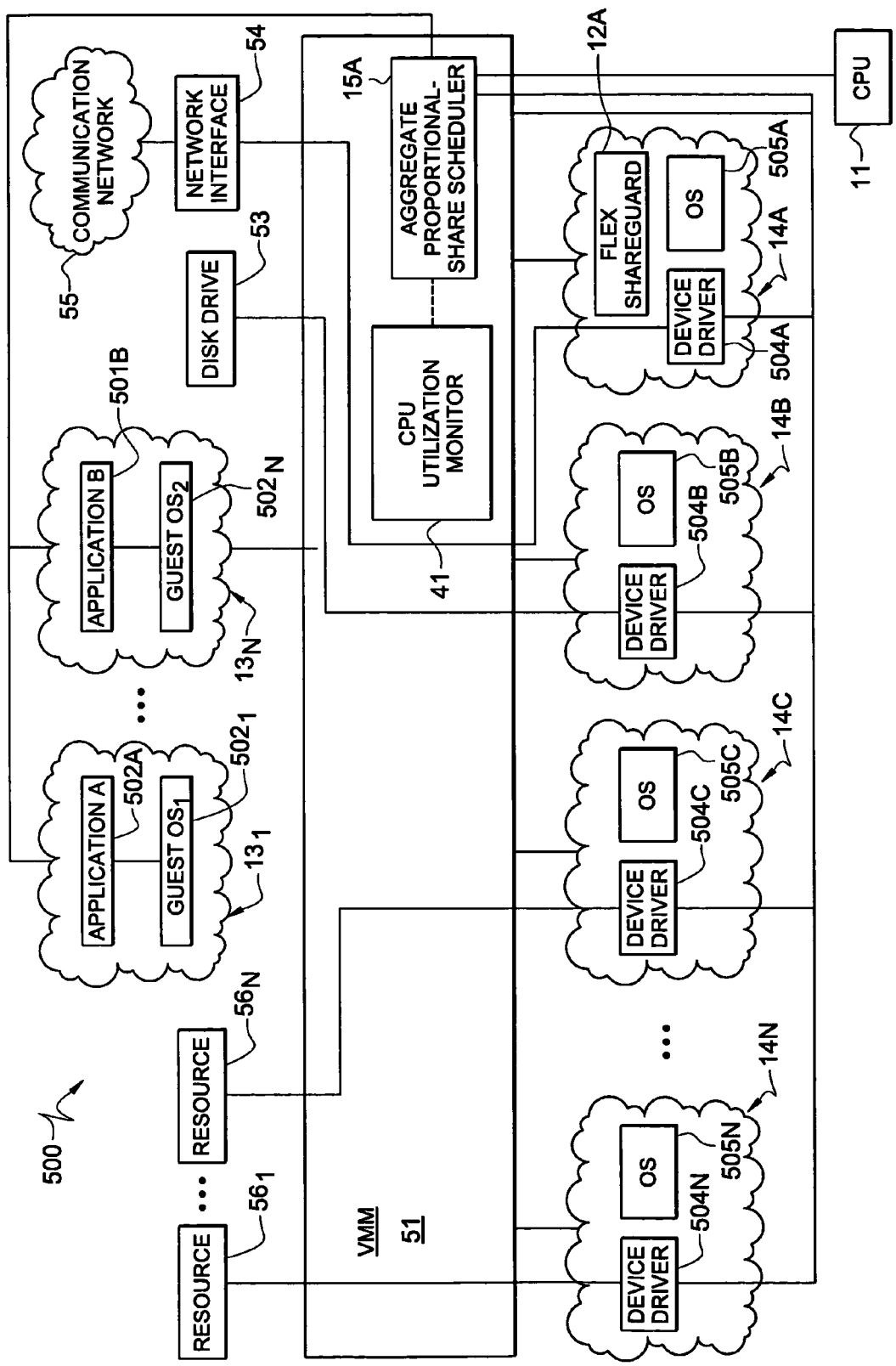
FIG. 5 shows an exemplary virtualized system in which an embodiment of Flex Shareguard logic is employed according to one embodiment of the present invention.

FIG. 5 shows an exemplary virtualized system in which an embodiment of Flex Shareguard logic 12A is employed. As shown, computer system 500 has any number "N" of VMs or "domains" $13_1, \ldots, 13_N$ implemented thereon (referred to collectively as VMs 13). Such virtualization may be achieved utilizing any suitable technique now known or later discovered. Within each VM 13, a guest OS is executing, such as guest $OS_1$ $502_1$ in VM $13_1$ and guest $OS_N$ $502_N$ in VM $13_N$. Further, one or more applications may be executing within each VM $13_1$ such as application A 501A in VM $13_1$ and application B 501B in VM $13_N$. VMM 51 is implemented, which is a software layer that virtualizes the available resources of computer system 500 and multiplexes them among the various VMs 13 (e.g., the various guest OSs) on the computer system.

System 500 further includes CPU 11, and various shared resources of which VMM 51 manages access by the various VMs 13. The system's shared resources include I/O resources, such as disk drive 53 (e.g., hard drive, floppy drive, tape drive, optical drive, SCSI interface, IDE, etc.) and network interface 54 (e.g., any of a variety of different network interface cards (NICs) and/or adapters), which enables system 500 to interface to communication network 65 (which may be a local area network (LAN), the Internet or other Wide Area Network (WAN), an intranet, a wireless network, telephony network, any combination of the aforementioned networks, and/or any other communication network now known or later developed within the networking arts which permits two or more computers to communicate with each other). The shared resources may include any number of other resources $56_1, \ldots, 56_N$ to which VMM 51 manages access of the VMs 13, examples of which include without limitation memory (e.g., RAM) and block data storage (e.g., disks).

Any number of driver domains, such as driver domains 14A-14N (referred to collectively as driver domains 14), may also be included, each of which contain device drivers for certain ones of the shared resources. In certain embodiments, driver domains 14 may each be an isolated driver domain. In the illustrated example, device drivers 504A-504N (referred to collectively as device drivers 504) are included in domains 14A-14N, respectively, for supporting access to disk drive 53, network interface 54, and resources $56_1, \ldots, 56_N$. In the example shown, device driver 504A for accessing network interface 54 resides in driver domain 14A; device driver 504B for accessing disk drive 53 resides in driver domain 14B; device driver 504C for accessing resource $56_N$ resides in driver domain 14C; and device driver 504N for accessing resource $56_1$ resides in driver domain 14N. In this exemplary virtualized system 500, the VMs 13 communicate (e.g., through a virtualized interface supported by VMM 51) to driver domain 14A for accessing network interface 54, to driver domain 14B for accessing disk drive 53, to driver domain 14C for accessing shared resource $56_N$, and to driver domain 14N for accessing shared resource $56_1$. Each of the driver domains 14 also includes an OS 505, such as OS 505A in driver domain 14A, OS 505B in driver domain 14B, OS 505C in driver domain 14C, and OS 505N in driver domain 14N.

As described above, VMM 51 is a software layer that is commonly implemented in virtualization architectures, which virtualizes the available resources of computer system 500 and multiplexes them among the various VMs 13. Thus, to access certain resources, the VMs 13 communicate via the VMM 51 to the driver domains 14 (e.g., either directly, as in a paravirtualized system, or via the VMM intercepting communication of the VMs, as in many fully-virtualized systems). That is, in certain implementations, the system is paravirtualized, in which the guest OS of each VM 13 is adapted in some manner to communicate with VMM 51. In other implementations, the guest OSs may not be so adapted, but instead the VMM 51 may act to intercept certain resource accesses attempted by the guest OSs, in which case embodiments of the present invention may be employed for any such virtualized system (e.g., fully-virtualized or paravirtualized system).

In certain embodiments, the driver domains 14 are implemented as isolated driver domains (IDDs), which isolate failure of a given driver from causing a failure of any other domains (other driver domains, guest domains (e.g., VMs), etc.). Recent studies show that device drivers are frequently responsible for operating system failures. For example, a study from Stanford university found that the Linux drivers have 3 to 7 times the bug frequency as the rest of the OS. Similarly, product support calls for Windows 2000 showed that device drivers accounted for 27% of crashes compared to 2% for kernel support. Device drivers can be viewed as a type of kernel extensions, added after the fact. Commercial operating systems are typically extended by loading unsafe object code and linking it directly with the kernel. To reduce the risk of device misbehavior and to address problems of dependability, maintainability, and manageability of I/O devices, the Xen-3™ virtualization system available from Hewlett-Packard Company uses the complete original OS itself as the compatibility wrapper for a device driver. The original OS effectively becomes an execution container for the driver. Thus, the exemplary system 500 may include IDDs 14, which include device drivers residing therein. In such an implementation, the device drivers may run unmodified in privileged guest OSs. An IDD in which a device driver for supporting access to a communication network may be referred to as a net-IDD herein.

As shown in FIG. 5, a CPU utilization monitor 41 may be implemented that determines, for each of the VMs 13, a corresponding amount of CPU utilization of driver domains 14 that is attributable to such VM 13. Aggregate proportional-share scheduler 15A may take into consideration the aggregate CPU usage of each of VMs 13, including the corresponding amount of CPU usage of driver domains 14 attributable to each VM, for scheduling CPU usage for such VMs 13, as described further herein. Additionally, as described further herein, Flex Shareguard logic 12A is implemented to flexibly limit the amount of CPU usage by a driver domain on behalf of a given VM. In this example, Flex Shareguard logic 12A is employed for IDD 14A for flexibly limiting the amount of CPU usage by the network device driver 504A on behalf of a given VM. Of course, the Flex Shareguard logic 12A may be likewise employed instead or in addition within any of the other IDDs 14. Further, a different flexible limit on the amount of CPU usage by the IDD 14A may be defined for each of the VMs 13. That is, a first flexible limit on the amount of CPU usage by IDD 14A on behalf of VM $13_1$ may be defined (e.g., by a user), and a different flexible limit on the amount of CPU usage by IDD 14A on behalf of VM $13_N$ may be defined. As discussed above, in certain embodiments, the respective flexible limits for each VM may be defined as a function of their respective aggregate proportional shares of CPU access.

Various types of weighted proportional-share CPU schedulers are known, and any weighted proportional-share scheduler now known or later developed may be adapted in order to implement aggregate proportional-share scheduler 15A for scheduling CPU access for VMs based on an aggregate of CPU usage attributable to each VM. As one example, an embodiment that adapts the well-known Simple Earliest Deadline First (SEDF) scheduler for implementing aggregate proportional-share scheduler 15A is described further in concurrently filed and commonly assigned U.S. Pat. No. 8,032,882 titled "SYSTEM AND METHOD FOR CONTROLLING AGGREGATE CPU USAGE BY VIRTUAL MACHINES AND DRIVER DOMAINS", the disclosure of which is incorporated herein by reference. An exemplary adapted SEDF scheduler described therein is referred to as SEDF-Debt Collector (or "SEDF-DC"). The exemplary SEDF-DC scheduler is operable to allocate combined X % CPU share to a particular $VM_i$ over time such that $X=X_i+Y_k$, where $X_i$ is CPU usage by $VM_i$ and $Y_k$ is CPU usage by $IDD_k$ as a result of I/O processing on behalf of the guest domain $VM_i$.

As one example, consider the following exemplary scheduling scenario according to one embodiment of the present invention. Suppose that aggregate proportional-share scheduler 15A schedules access by the VMs 13 and driver domain(s) 14 to CPU 31 in scheduling intervals, which may be 100 ms each for example. Further suppose for this scenario that a given VM, $VM_1$, is weighted such that its proportional share of each scheduling interval is 30% (i.e., 30 ms). And, suppose that a driver domain 14 is equally weighted such that it is also allocated 30% of each scheduling interval (i.e., 30 ms). Suppose that a flexible limit on the amount of CPU usage by driver domain on behalf of $VM_1$ is defined as 15 ms.

Continuing with the exemplary scheduling scenario, now suppose that $VM_1$ is allocated a 30% share of a first scheduling interval ("scheduling interval 1"). Additionally, during scheduling interval 1 driver domain 14 is allocated its 30% share, of which it uses 15 ms (or 15% of the scheduling interval) on behalf of $VM_1$ (e.g., driver domain 14 uses a 15% share of CPU in interval 1 on behalf of $VM_1$). Thus, $VM_1$ effectively receives an aggregate 45% share of CPU in interval 1, which exceeds its proportional share of 30%. Accordingly, in the next scheduling interval, interval 2, the aggregate proportional-share scheduler 15A allocates a 15% share of the interval to $VM_1$. This, brings the overall CPU allocated to $VM_1$ over intervals 1 and 2 back to the 30% proportion.

Suppose now that in interval 1, the scheduler 15A allocates a 30% share to $VM_1$, and additionally allocates to driver domain 14 its 30% share of CPU, wherein driver domain 15 uses the first 15 ms of such share on behalf of $VM_1$, thus reaching the flexible limit defined for $VM_1$. Further suppose that the remaining 15 ms in the share of CPU scheduled for the driver domain is "slack", wherein such remaining portion of the share is not needed for use on behalf of any other VMs. According to an embodiment of the present invention, Flex Shareguard 12A allows the driver domain to exceed the 15 ms limit defined for the $VM_1$ in this situation, e.g., use the remaining 15 ms of the driver domain's share on behalf of the $VM_1$. Thus, in this example the entire 30 ms share of the driver domain may be used on behalf of the $VM_1$. In certain embodiments, the usage of the "slack" portion of the share beyond the flexible limit defined for the $VM_1$ may not be counted against the $VM_1$'s aggregate CPU usage. Thus, instead of considering 30 ms of usage by the driver domain on behalf of the $VM_1$ in the first scheduling interval (which would reduce the scheduled CPU amount of the $VM_1$ in the next scheduling interval by 30 ms, resulting in 0 ms of CPU scheduled for the $VM_1$ in the next scheduling interval in this example), only the 15 ms used up to the defined flexible limit for the $VM_1$ may be so considered. Therefore, because the 15 ms used by the driver domain 15 in the first scheduling interval on behalf of $VM_1$ is considered in determining the aggregate CPU usage of the $VM_1$, the scheduler 15A adjusts the allocation of interval 2 to 15% for $VM_1$.

Thus, certain embodiments of the present invention employ Flex Shareguard logic 12A for flexibly limiting the amount of CPU usage of a driver domain on behalf of a given VM, thus ensuring that a minimum amount of the aggregate CPU attributable to the VM is available for the VM's direct usage. Of course, embodiments of the present invention are not limited in application to use with such an aggregate proportional-share scheduler, but this merely provides one example of a system in which it may be desirable to employ Flex Shareguard logic 12A.

Thus, as described above, an aggregate proportional-share scheduler, such as SEDF-DC, accounts for aggregate VM resource consumption in allocating CPU. Additionally, Flex ShareGuard logic 12A is operable to flexibly limit the total amount of resources (CPU in the above example) consumed in a driver domain (e.g., privileged domain, isolated driver domain, etc.) based on administrator-specified limits. According to one embodiment, Flex ShareGuard logic 12A provides a control mechanism that flexibly enforces a specified limit on CPU time consumed by a driver domain (e.g., an isolated driver domain in which a network driver resides, which may be referred to herein as a "net-IDD") on behalf of a particular guest domain (or "VM"). Flex ShareGuard logic 12A is independent of the particular CPU scheduler 15 that may be employed, and hence may serve as a general mechanism to control the CPU consumed by driver domains on behalf of different guest domains.

According to one embodiment, Flex ShareGuard logic 12A supports two modes that VMs can use for describing their CPU needs for network processing in an $IDD_k$:

1) fixed limit mode that is used to enforce a specified limit of CPU time consumed by $IDD_k$ on behalf of a particular guest domain $VM_i$; and 2) slack time mode that enables guest domain $VM_i$ for receiving an additional slack time for network processing in $IDD_k$ when $IDD_k$ is lightly loaded and has "unused CPU time".

Certain embodiments of the Flex ShareGuard logic 12A enables tailored CPU consumption among different VMs with competing network traffic requirements, provides performance isolation guarantees for VMs sharing the same network devices, and prevents denial of service situations. An exemplary implementation of the Flex ShareGuard logic 12A is described herein as targeting the Xen™ VMM and applications performing network I/O. However, embodiments of the Flex ShareGuard logic 12A are not limited in this regard, but may generally be applied to other VMMs and/or other auxiliary resources, such as disk I/O.

According to one embodiment, the actions performed by Flex ShareGuard logic 12A are similar to those actions performed by the ShareGuard logic described in concurrently filed and commonly assigned U.S. patent application Ser. No. 11/494,187 titled "SYSTEMS AND METHODS FOR CONTROLLING RESOURCE USAGE BY A DRIVER DOMAIN ON BEHALF OF A VIRTUAL MACHINE", the disclosure of which is incorporated herein by reference. However, according to one embodiment, the policies and conditions when certain actions are called and for how long these actions enforce filtering rules are differ in Flex ShareGuard logic 12A. For example, an exemplary implementation of the ShareGuard logic is designed to support the SEDF scheduler with no "slack" CPU flag parameter set, and can only support fixed limit mode that is used to enforce a specified limit of CPU time consumed by $IDD_k$ on behalf of a particular guest domain $VM_i$. As described further herein, an embodiment of Flex ShareGuard logic 12A further supports slack time mode.

To briefly describe one exemplary implementation of Flex ShareGuard logic 12A, let net-IDD be a driver domain with a networking device that is shared by $Dom_1, \ldots, Dom_n$. A special control mechanism is included in Flex ShareGuard logic 12A that augments functionality of net-IDD with additional management functions. In this exemplary embodiment, Flex ShareGuard logic 12A can perform, on demand, the following 2 actions:

1) stop processing network traffic on behalf of $Dom_i$. This stopping step may comprise two sub-steps:
   a) stop accepting incoming traffic to domain $Dom_i$; and
   b) stop processing outgoing traffic from domain $Dom_i$.

2) start processing network traffic on behalf of $Dom_i$. This starting step restores the normal configuration and also comprises two sub-steps:
   a) start accepting incoming traffic to domain $Dom_i$; and
   b) start processing outgoing traffic from domain $Dom_i$.

The above operations may be implemented as described further herein. First, exemplary techniques that may be employed for stopping/starting the acceptance of incoming traffic to a domain are described. For net-IDDs running Linux, Linux's advanced routing and traffic control mechanisms may be used, for example, to drop/reject traffic destined for a particular domain. In particular, the iptables may be used because they are highly configurable from user space. It should be noted that each virtual interface on each domain may have its own distinct IP address (this is easily available via $Domain_0$ in Xen™). Say, for instance, that IP addresses $ip_1, \ldots, ip_n$ belong to virtual interfaces of $Dom_i$. Then the following sequence of rules may be used to configure iptables to drop packets for this domain early on in the networking stack, thus incurring least processing overhead:

---
iptables -A INPUT -d $ip_1$ -j DROP
...
iptables -A INPUT -d $ip_n$ -j DROP
---

Similar techniques can be applied in other operating systems that may serve as wrappers for some other legacy device drivers, for example. There is a symmetrical sequence of rules that may be used to configure iptables to accept packets for this domain:

---
iptables -A INPUT -d $ip_1$ -j ACCEPT
...
iptables -A INPUT -d $ip_n$ -j ACCEPT.
---

Exemplary techniques that may be used for stopping/starting processing of outgoing traffic from a domain are now briefly described. As in the above case, iptables may be used to drop packets coming from a domain and going out. However, that will still incur substantial work in the net-IDD because iptables will only process the packet once it has traversed the network stack of the net-IDD. It may be desirable to drop the packet before it even enters the net-IDD so that there is no overhead. One way of doing this is to enforce iptables filtering within the guest domain. However, in certain embodiments, Flex ShareGuard logic 12A does not assume any cooperation from guests, and so this option may not be practical in those embodiments.

It should be noted that in certain embodiments, a virtualized back-end interface (referred to as the "netback driver" in Xen™) may be implemented within a net-IDD, through which all traffic between the net-IDD and VMs flows. Such a virtualized back-end interface provides an attractive control point within the net-IDD where packets can be dropped before entering the net-IDDs network stack. Such a virtualized back-end interface (e.g., netback) is described further in concurrently filed and commonly assigned U.S. patent applications: 1) Ser. No. 11/493,506 titled "SYSTEM AND METHOD FOR ATTRIBUTING TO A CORRESPONDING VIRTUAL MACHINE CPU UTILIZATION OF A NETWORK DRIVER DOMAIN BASED ON OBSERVED COMMUNICATION THROUGH A VIRTUALIZED INTERFACE", and 2) Ser. No. 11/493,492 titled "SYSTEM AND METHOD FOR ATTRIBUTING TO A CORRESPONDING VIRTUAL MACHINE CPU UTILIZATION OF A NETWORK DRIVER DOMAIN BASED ON WEIGHTED COMMUNICATION", the disclosures of which are incorporated herein by reference. In certain embodiments of the present invention, the Flex ShareGuard logic 12A sends a notification to the virtualized back-end interface (e.g., "netback") of a driver domain identifying the target domain and the desired action (e.g., drop packets, forward packets, etc). This is akin to setting iptable rules, except that these rules will be applied within the virtualized back-end interface (e.g., netback) of the net-IDD.

Whenever netback receives an outbound packet from a domain (e.g., VM), it determines if there are any rules applicable to this domain. If so, netback takes the desired action according to the applicable rules (e.g. drop the packet instead of forwarding it to the actual device driver). This is both lightweight (in terms of overhead incurred by the IDD) and flexible (in terms of control exercised by the IDD).

As an example of a work conserving scheduler that may be implemented to receive "slack" CPU time, an exemplary embodiment employing the well-known Simple Earliest Deadline First scheduler (SEDF) scheduler is now described. The SEDF scheduler provides weighted CPU sharing in an intuitive way and uses real time-algorithms to ensure time guarantees. In this exemplary embodiment, each domain $Dom_i$ (as well as IDDs) specifies its CPU requirements by a tuple $(s_i, p_i, x_i)$, where the slice $s_i$ and the period $p_i$ together represent CPU share that $Dom_i$ requests: $Dom_i$ will receive at least $s_i$ units of time in each period of length $p_i$. $x_i$ is a boolean value used to indicate whether domain $Dom_i$ is eligible to receive "slack" CPU time.

The SEDF scheduler maintains 3 queues:
1) $Q_r$—a queue of runnable domains;
2) $Q_w$—a queue of domains that have exhausted their slice and are waiting for the next period; and
3) $Q_b$—a queue of blocked domains.

For each domain $Dom_i$, the scheduler keeps track of two additional values $(d_i, r_i)$:

a) $d_i$—domain's current deadline for CPU allocation, which is the time at which the current period of domain $Dom_i$ ends; and b) $r_i$—domain's current remaining time for CPU allocation, which is the CPU time remaining to domain $Dom_i$ within its current period.

SEDF uses a notion of deadlines to pick the domain to be scheduled next. Intuitively, deadline denotes the absolute time by which a domain should have received its specified share of the CPU. It should be noted that this differs from the period because the period only specifies a "window" or interval of time whereas deadline is a specific point in absolute time.

Both $Q_r$ and $Q_w$ are kept sorted by deadlines which makes picking the next domain to be scheduled a constant time operation. This does not mean however, that the scheduler is O(1), since some other work may also need to be done.

To begin with, each domain $D_i$'s deadline is set to NOW+ $p_i$, where NOW denotes the current, real time. The SEDF scheduler queues may be updated on each invocation of the scheduler as follows:

1. The time $gotten_i$ for which the current $Dom_i$ has been running is deducted from its value $r_i$, i.e. $r_i=r_i-gotten_i$.

2. If as a result a remaining time $r_i$ becomes equal to 0, i.e. $r_i=0$, then $Dom_i$ is moved from $Q_r$ to $Q_w$. This means that $Dom_i$ has received its required CPU time in the current period.

3. For each domain $Dom_k$ in $Q_w$, if NOW>=$d_k$ then the following updates are performed:
   a) $r_k$ is reset to $s_k$, i.e. $r_k=s_k$;
   b) the new deadline is set to $d_k+p_k$, i.e. $d_k=d_k+p_k$; and
   c) $Dom_k$ is moved from $Q_w$ to $Q_r$.

4. The next timer interrupt is scheduled for $(d_w^h+p_w^h, d_r^h)$, where $d_w^h, p_w^h$, and $d_r^h, p_r^h$, denote the deadline and period of the domains that are respective heads of $Q_r$ and $Q_w$ queues.

5. On the interrupt, the scheduler runs the head of $Q_r$. If $Q_r$ is empty, it selects an element of $Q_w$.

6. When domain $Dom_k$ in $Q_b$ is unblocked it is moved from $Q_b$ to $Q_r$ and if NOW>=$d_k$ then the following updates are performed:
   a) $r_k$ is reset to $s_k$, i.e. $r_k=s_k$; and
   b) the new deadline is set to $d_k+p_k$, i.e. $d_k=d_k+p_k$.

7. Use of the slack time: as long as running queue $Q_r$ is non-empty, a domain in the head of $Q_r$ will be chosen to run. If $Q_r$ becomes empty, this means that the scheduler has fulfilled all its commitments until the head in $Q_w$ becomes runnable. In this case, domain $Dom_k$ in $Q_w$, that is eligible to receive "slack" CPU time, i.e. $x_k=1$, is chosen to run for a small time quantum (e.g. 500 µs). Thus several domains can run (e.g., they can be picked randomly or in round robin manner) before $Q_r$ becomes non-empty. It should be noted that this "slack time" feature enables higher CPU utilization because unused CPU time can be shared among domains that are eligible to receive "slack" CPU time. This feature can be used by the driver domains to receive extra CPU time on the top of a specified share.

An exemplary implementation of Flex ShareGuard logic 12A for enforcing a flexible policy for resource management in network driver domains according to one embodiment of the present invention is now described. Let net-IDD be a driver domain with a networking device that is shared by $Dom_1, \ldots, Dom_n$. Let the CPU requirement of net-IDD be specified by a pair $\{s^{IDD}, p^{IDD}\}$. This means that net-IDD will receive CPU at least $s^{IDD}$ units of time in each period of length $p^{IDD}$. In other words, this specification is bounding CPU consumption of net-IDD over time to:

$$CPU\_share^{IDD} = \frac{s^{IDD}}{p^{IDD}}.$$

For each guest domain $Dom_i$ that uses device drivers in net-IDD, its CPU allocation requirements for processing in net-IDD is described via a pair $(limit_i^{IDD}, slack_i^{IDD})$, where $limit_i^{IDD}$ specifies a fraction of CPU time in net-IDD available for network processing on behalf of $Dom_i$ such that $$\sum_{1 \le i \le n} limit_i^{IDD} = CPU\_share^{IDD}, \text{ and } slack_i^{IDD}$$

is a boolean value that specifies whether $Dom_i$ is eligible for receiving "slack" CPU time available in net-IDD.

If $slack_i^{IDD}=0$, then Flex ShareGuard logic 12A's goal is to limit CPU consumption by net-IDD on behalf of $Dom_i$ to $limit_i^{IDD}$ over time. To achieve this goal, the exemplary ShareGuard policy and mechanism described in concurrently filed and commonly assigned U.S. patent application Ser. No. 11/494,187 titled "SYSTEMS AND METHODS FOR CON- TROLLING RESOURCE USAGE BY A DRIVER DOMAIN ON BEHALF OF A VIRTUAL MACHINE", the disclosure of which is incorporated herein by reference, may be used.

If $slack_i^{IDD}=1$ and net-IDD has fulfilled all its commitments with respect to guest domains and net-IDD has its unused CPU time, then $Dom_i$ is eligible for receiving "slack" CPU time available in net-IDD. According to one exemplary implementation of a control mechanism for Flex ShareGuard logic 12A, a 1 second time interval is used for enforcing this limit. Thus, CPU consumption by net-IDD on behalf of $Dom_i$ is controlled to $limit_i^{IDD}$ over a 1 second time interval.

It should be noted, for instance, that notation $CPU\_share^{IDD}=30\%$ in 1 second interval means that net-IDD will be allocated 0.3 sec or 300 ms of CPU time over the 1 second interval. To simplify the description, the same notation $CPU\_share^{IDD}$ and $limit_i^{IDD}$ is often used herein for meaning a fraction of CPU in terms of "%" and in terms of "ms".

Using a CPU utilization monitor 41, information on CPU usage by net-IDD may be collected every h ms interval (e.g., h=10 ms), and a fraction of CPU time $used_i^{IDD}$ that was used by net-IDD for networking processing on behalf of $Dom_i$ ($1 \leq i \leq n$) during the latest h ms interval may be computed. For each 1 second of real time, two additional values (overall_$used_i^{IDD}$, TimeLeft) may be tracked, where overall_$used_i^{IDD}$ describes the CPU time used by net-IDD on behalf of $Dom_i$ in the current 1 second interval. At the beginning of each new 1 second interval, the value of overall_$used_i^{IDD}$ is set to 0, i.e. initially, overall_$used_i^{IDD}=0$. TimeLeft is a running time counter indicating the time left in the current 1000 ms interval. At the beginning of each new 1 second interval, TimeLeft is set to 1000 ms, i.e. initially, TimeLeft=1000 ms. At the end of each h ms interval, the following actions are performed:

a) overall_$used_i^{IDD}$=overall_$used_i^{IDD}$+$used_1^{IDD}$; and b) TimeLeft=TimeLeft−h.

In this exemplary implementation, the control mechanism of FlexShare Guard logic 12A observes validity of the following condition: overall_$used_i^{IDD} \leq limit_i^{IDD}$. When this condition is violated, it indicates that $Dom_i$ has exhausted its CPU share for network traffic processing by net-IDD. In this instance, Flex ShareGuard logic 12A will verify which step should be applied depending on the current situation:

a) if $slack_i^{IDD}=0$, then Flex ShareGuard logic 12A performs a defensive action (e.g., stops processing network traffic on behalf of $Dom_i$). Such a state for $Dom_i$ is denoted as a stopped service state, and it continues for the duration TimeLeft; and b) if $slack_i^{IDD}=1$, then there are two possible continuations:

i) there is at least one guest domain $Dom_k$ that has not yet consumed its specified CPU share in net-IDD, i.e. overall_$used_i^{IDD} \leq limit_i^{IDD}$. In this case, Flex ShareGuard logic 12A performs a defensive action (e.g., stop processing network traffic on behalf of $Dom_i$), which stops processing on behalf of $Dom_i$ for the during TimeLeft; and ii) if each guest domain $Dom_k$ has consumed its specified CPU share in net-IDD, i.e. the condition overall_$used_k^{IDD} \leq limit_k^{IDD}$ holds, then the net-IDD has fulfilled all its commitments with respect to the guest domains. In this instance, the net-IDD can use the remaining CPU time for network processing on behalf of domains that are eligible for receiving "slack" CPU time. Therefore, Flex ShareGuard logic 12A performs an "offensive" action, e.g., to start processing network traffic on behalf of $Dom_j$ for any domain $Dom_j$ such that $slack_j^{IDD}=1$ and that $Dom_j$ is in stopped service state.

At the end of each 1 second interval, for any $Dom_j$ that is in stopped service state, Flex ShareGuard logic 12A performs an action to start processing network traffic on behalf of $Dom_j$. That is, the stopped service state is changed to a start service state.

This exemplary new policy described above allows controlling resource consumption in net-IDD in a more efficient way, while still providing a desirable property of performance isolation for guest domains that share access to the device driver hosted by net-IDD. The exemplary new policy described above guarantees fair and limited CPU usage in net-IDD among competing domains. Only in the case of additional CPU resources available to the net-IDD, some of the guests with explicitly set "permission" (i.e. that are eligible for receiving "slack" CPU) will be allowed for additional network processing on their behalf. In such a way, this exemplary implementation of Flex ShareGuard logic 12A supports performance isolation among different guest domains, which means that "bad" performance in one guest domain does not impact the performance of other guest domains. For example, if one guest domain experiences a Denial of Service attack, this situation will not impact the performance of the other guest domains sharing the same network device driver.

Let us assume, for example, that $Dom_j$ experiences a Denial of Service attack, and let us analyze how this situation is handled under the above-described exemplary embodiment of Flex ShareGuard logic 12A. A typical danger under Denial of Service attack is that $Dom_j$ will consume uncontrolled amount of CPU resources in net-IDD, and this in its own turn will significantly limit network processing on behalf of the other guest domains. Under such scenario, the other guest domains might experience a similar "resource" shortage for network processing as under the Denial of Service attack.

With the exemplary embodiment of Flex ShareGuard logic 12A described above, the usage of CPU resource in net-IDD on behalf of different guest domains is strictly controlled: each guest domain is allowed to consume only a designated fraction of resources allocated to net-IDD. Once this limit is reached, Flex ShareGuard logic 12A will "turn on" the preventive/defensive actions and stop network traffic to/from the corresponding guest domain. However, some flexibility is still permitted with this exemplary embodiment because if some guest domains are eligible for receiving "slack" CPU time, then this slack CPU time is allocated to the corresponding guest domains only after all of domains have received their designated fraction of resources in net-IDD.

The exemplary aggregate proportional-share scheduler 32 and/or flexible controller 12 (e.g., Flex ShareGuard logic 12A) described herein, when implemented via computer-executable instructions, are in essence the software code defining the operations thereof. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information. In certain embodiments, a CPU may execute the various logical instructions according to embodiments of the present invention. For example, a CPU may execute machine-level instructions according to the exemplary operational flows described above in conjunction with FIGS. 2A-2B.

It shall be appreciated that the present invention is not limited to the architecture of the system on embodiments thereof may be implemented. For example, any suitable processor-based device may be utilized for implementing the above-described operations, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

What is claimed is:

1. A method comprises:
   determining a flexible limit on an amount of resource usage by a driver domain on behalf of a given virtual machine (VM); and
   controlling the resource usage by the driver domain on behalf of the given VM so as not to exceed the flexible limit except under a permitted condition;
   wherein said controlling comprises: controlling the resource usage by the driver domain on behalf of the given VM so as not to exceed the flexible limit except when a slack share of resource usage is available to the driver domain.

2. The method of claim 1 wherein the resource usage comprises usage of a central processing unit (CPU).

3. The method of claim 1 wherein the driver domain comprises a network driver domain in which a device driver usable by the given VM for network communication resides.

4. The method of claim 1 comprising: determining a proportional share of a scheduling interval to allocate to the driver domain.

5. The method of claim 4 wherein the flexible limit is less than the proportional share of the scheduling interval allocated to the driver domain.

6. A method comprising:
   determining a flexible limit on an amount of resource usage by a driver domain on behalf of a given virtual machine (VM); and
   controlling the resource usage by the driver domain on behalf of the given VM so as not to exceed the flexible limit except under a permitted condition, wherein said controlling comprises: controlling the resource usage by the driver domain on behalf of the given VM so as not to exceed the flexible limit except when a slack share of resource usage is available to the driver domain, and wherein the slack share of resource usage is a share of resource usage allocated to the driver domain that will not otherwise be used on behalf of another VM.

7. A method comprising:
   determining a flexible limit on an amount of resource usage by a driver domain on behalf of a given virtual machine (VM); and
   controlling the resource usage by the driver domain on behalf of the given VM so as not to exceed the flexible limit except under a permitted condition, wherein the permitted condition comprises a slack share of resource usage being available to the driver domain during a scheduling interval, wherein the slack share is a share of the resource usage allocated to the driver domain during the scheduling interval that will not otherwise be used by the driver domain on behalf of another VM during the scheduling interval.

8. The method of claim 1 wherein said controlling comprises determining whether resource usage by the driver domain on behalf of the given VM during a scheduling interval reaches the flexible limit, the method comprising:
   when determined that the flexible limit is reached in the scheduling interval, determining whether slack resource usage is available to the driver domain in the scheduling interval.

9. A method comprising:
   determining a flexible limit on an amount of resource usage by a driver domain on behalf of a given virtual machine (VM); and
   controlling the resource usage by the driver domain on behalf of the given VM so as not to exceed the flexible limit except under a permitted condition, wherein said controlling comprises determining whether resource usage by the driver domain on behalf of the given VM during a scheduling interval reaches the flexible limit, the method comprises:
   when determined that the flexible limit is reached in the scheduling interval, determining whether slack resource usage is available to the driver domain in the scheduling interval, and
      when determined that slack resource usage is available to the driver domain in the scheduling interval, permitting usage of the resource by the driver domain on behalf of the given VM beyond the fixed limit in the scheduling interval.

10. A method comprising:
    determining a flexible limit on an amount of resource usage by a driver domain on behalf of a given virtual machine (VM); and
    controlling the resource usage by the driver domain on behalf of the given VM so as not to exceed the flexible limit except under a permitted condition, wherein said controlling comprises determining whether resource usage by the driver domain on behalf of the given VM during a scheduling interval reaches the flexible limit, the method comprises:
    when determined that the flexible limit is reached in the scheduling interval, determining whether slack resource usage is available to the driver domain in the scheduling interval, and
       when determined that no slack resource usage is available to the driver domain in the scheduling interval, taking defensive action to prevent further resource usage by the driver domain on behalf of the given VM in the scheduling interval.

11. A system comprising:
    virtual machine (VM);
    driver domain;
    shared resource that is usable by the VM and by the driver domain; and
    controller for flexibly limiting usage of the shared resource by the driver domain on behalf of the VM to prevent the usage of the shared resource by the driver domain on behalf of the VM from exceeding a determined amount except under a permitted condition;
    wherein said controlling comprises: controlling the resource usage by the driver domain on behalf of the given VM so as not to exceed the flexible limit except when a slack share of resource usage is available to the driver domain.

12. The system of claim 11 wherein the permitted condition comprises when a slack share of resource usage is available to the driver domain.

13. The system of claim 11 wherein the shared resource comprises a central processing unit (CPU), and wherein the driver domain comprises a device driver that is usable by the VM for communicating via a communication network.

14. A system comprising:
virtual machine (VM);
driver domain;
shared resource that is usable by the VM and by the driver domain; and
controller for flexibly limiting usage of the shared resource by the driver domain on behalf of the VM to prevent the usage of the shared resource by the driver domain on behalf of the VM from exceeding a determined amount except under a permitted condition, wherein the permitted condition comprises when a slack share of resource usage is available to the driver domain and wherein the slack share of resource usage comprises a share of resource usage allocated to the driver domain during a scheduling interval that will not otherwise be used on behalf of another VM during the scheduling interval.

15. A system comprising:
virtual machine (VM);
driver domain;
shared resource that is usable by the VM and by the driver domain;
a controller for flexibly limiting usage of the shared resource by the driver domain on behalf of the VM to prevent the usage of the shared resource by the driver domain on behalf of the VM from exceeding a determined amount except under a permitted condition; and
an aggregate proportional-share scheduler that schedules aggregate usage of the shared resource for the VM in proportion to a respective weight assigned to the VM, wherein the aggregate usage of the shared resource by the VM comprises usage of the shared resource by the driver domain on behalf of the VM and usage of the shared resource by the VM.

16. A system comprising:
virtual machine (VM);
driver domain;
shared resource that is usable by the VM and by the driver domain; and
controller for flexibly limiting usage of the shared resource by the driver domain on behalf of the VM to prevent the usage of the shared resource by the driver domain on behalf of the VM from exceeding a determined amount except under a permitted condition, wherein the controller prevents usage of the shared resource by the driver domain on behalf of the VM during a given scheduling interval from exceeding a predefined limit, except when a share of resource usage allocated to the driver domain during the scheduling interval will not otherwise be used by the driver domain on behalf of another VM during the scheduling interval.

* * * * *